(12) United States Patent
Hunt et al.

(10) Patent No.: US 7,211,294 B2
(45) Date of Patent: May 1, 2007

(54) METHOD OF MAKING A MATERIAL

(75) Inventors: Joanne Hunt, Abbots Langley (GB); Julie Baker, Watford (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/629,392

(22) Filed: Jul. 29, 2003

(65) Prior Publication Data

US 2004/0028817 A1    Feb. 12, 2004

(30) Foreign Application Priority Data

Aug. 9, 2002    (GB) ................. 0218507.2

(51) Int. Cl.
*B05D 3/10*    (2006.01)
(52) U.S. Cl. .................................... 427/243
(58) Field of Classification Search ................ 427/243, 427/244
See application file for complete search history.

(56) References Cited

U.S. PATENT DOCUMENTS

| | | | |
|---|---|---|---|
| 3,794,548 A | | 2/1974 | Wirth et al. |
| 5,128,313 A | * | 7/1992 | Aono .......................... 503/227 |
| 5,334,483 A | * | 8/1994 | Baker et al. ................. 430/207 |
| 5,356,853 A | * | 10/1994 | Ueno et al. .................. 503/227 |
| 6,147,139 A | * | 11/2000 | Shaw-Klein et al. ........ 523/160 |
| 6,228,476 B1 | | 5/2001 | Bogrett et al. |
| 6,291,127 B1 | | 9/2001 | Dagan et al. |
| 6,299,302 B1 | * | 10/2001 | DeBoer et al. .......... 428/32.24 |
| 6,444,713 B1 | * | 9/2002 | Pachl et al. .................... 521/54 |
| 2001/0021726 A1 | | 9/2001 | Brown |

FOREIGN PATENT DOCUMENTS

| | | |
|---|---|---|
| EP | 0 474 494 B | 3/1992 |
| EP | 0 765 763 A | 4/1997 |
| EP | 0 816 113 B | 1/1998 |
| EP | 1060901 | * 12/2000 |
| KR | 2000-063640 | * 11/2000 |

OTHER PUBLICATIONS translation of KR 2000-0063640, Nov. 2000.*

* cited by examiner

*Primary Examiner*—Erma Cameron
(74) *Attorney, Agent, or Firm*—Chris P. Konkol

(57) ABSTRACT

The invention provides a method of making a material. The method comprises the step of coating a support with a solution comprising a hydrophilic polymer and a blowing agent. Either prior to or after the step of coating the support, the solution is interacted with in some way e.g. heated, to cause the blowing agent to generate gas bubbles within the solution, causing foaming of the hydrophilic polymer.

12 Claims, No Drawings ered quickly into the porous layer by capillary action. However, the open nature of the layer can contribute to instability of printed images. Inkjet media having a non-porous layer are typically formed by the coating of one or more polymeric layers onto a support. When ink is applied to such media, the polymeric layers swell and absorb the applied ink. However, due to limitations of the swelling mechanism, this type of media is slow to absorb the ink, but once dry, printed images are often stable when subjected to light and ozone.

METHOD OF MAKING A MATERIAL

This is a U.S. Original Patent Application which claims priority on United Kingdom Patent Application No. 0218507.2 filed Aug. 9, 2002.

FIELD OF THE INVENTION

The present invention relates to a method of making a material. In particular the invention relates to a method of making a foamed material suitable for use as, amongst other things, an inkjet medium.

BACKGROUND OF THE INVENTION

Most commercial photo-quality inkjet media can be classified in one of two categories according to whether the principal component material forms a layer that is porous or non-porous in nature. Inkjet media having a porous layer are typically formed of inorganic materials with a polymeric binder. When ink is applied to the medium it is absorbed quickly into the porous layer by capillary action. However, the open nature of the layer can contribute to instability of printed images. Inkjet media having a non-porous layer are typically formed by the coating of one or more polymeric layers onto a support. When ink is applied to such media, the polymeric layers swell and absorb the applied ink. However, due to limitations of the swelling mechanism, this type of media is slow to absorb the ink, but once dry, printed images are often stable when subjected to light and ozone.

A method of manufacturing a material that addresses these problems is required. The applicant has recognised that use of a polymer foam coated on a support would address the problems associated with the inkjet media. A method of manufacturing such a material is required. Although the material when manufactured would be useful as an inkjet media, its use would not be limited in this regard. Indeed, the material may find uses in any number of applications. For example, the material may be used as insulation tape, a coating for e.g. shelves, sticky-backed coating material, and any other possible use for a material.

Traditionally, polymer foams are manufactured using mostly hydrophobic thermoplastic materials such as Polyurethane, Polyvinyl Chloride (PVC) and Polyethylene, which require high processing temperatures. Initially, a gas-filled polymer is formed from which the polymer foam is formed. One example of a typical method of forming a gas-filled polymer relies on the thermal decomposition of chemical blowing agents within a polymer solution, thereby generating nitrogen $N_2$ or carbon dioxide $CO_2$ gas in the solution. The thermal decomposition may be caused by the application of heat or as a result of the exothermic heat of reaction during polymerisation.

An alternative method of creating a gas-filled polymer involves the mechanical whipping of gases into a polymer melt, which then hardens either by catalytic action or heat, trapping gas bubbles in a matrix. Low boiling point liquids LBPLs may also be used. Volatilisation of LBPLs e.g. methylene chloride within the polymer melt occurs as a result of the application of heat or the exothermic heat of reaction. Accordingly, gas is introduced into the polymer forming a gas-filled polymer. In one example, gas dissolved in a polymer expands upon reduction of pressure in the system, thereby causing the formation of gas bubbles in the polymer. Alternatively, microspheres may be incorporated into a polymer mass, the spheres consisting of gas-filled polymer that expands upon heating.

In all these cases, after obtaining the gas-filled polymer, typically a foam is then formed using one of three common manufacturing processes: compression moulding, reaction injection moulding or extrusion of the foam.

A problem with these processes is that the temperatures involved can be very high, e.g. in excess of 150° C., as the polymers used are in their molten state. The most common processing method used in creating polymer foam films is extrusion. This is a three stage operation consisting as a first stage of forming a polymer solution with gas dissolved in it. This may be achieved by injection of $N_2$ or $CO_2$ into the solution or by the use of blowing agent, to create a single phase solution. Next, nucleation sites are formed, as a result of a rapid pressure drop to create large numbers of uniform sites. Finally, cell growth then takes place by means of diffusion of the gas to form bubbles. Control of cell growth is achieved by controlling processing conditions such as pressure and temperature.

Methods of forming porous polymer layers have been disclosed such as those disclosed in U.S. Pat. No. 6,228,476 and U.S. Patent Application Serial No. 2001/0021726. Such methods rely on the use of curable polymers.

U.S. Pat. No. 3,794,548 discloses the use of polyurethane in a porous polymer film. Heating of the polymer causes volatilisation of solvents within the polymer resulting in a porous coating.

A method of forming a foamed polymer material is required that uses very low processing temperatures in comparison to all traditional methods.

SUMMARY OF THE INVENTION

According to the present invention, there is provided a method of making a material, comprising the steps of:

coating a support with a solution comprising a hydrophilic polymer and a blowing agent; and either prior to or after the step of coating said support, interacting with said solution, to cause said blowing agent to generate gas bubbles within the solution causing foaming of said hydrophilic polymer.

In one example, the step of interacting with the solution is performed after coating of the support and comprises applying heat to said solution. In this case, heat may be applied to the solution during drying of the coated support.

In an alternative example, the interaction with the solution comprises applying heat to the solution prior to coating of the support such the solution when coated onto the support has bubbles already formed therein. In this case, the heat may be applied by a heater coupled to a vessel holding the solution. Alternatively, heat may be applied by the addition of an acid to the solution to react with the blowing agent to thereby generate bubbles of gas in the solution.

ADVANTAGEOUS EFFECT OF THE INVENTION

The present invention provides a method of making a material that enables a polymer foam to be formed without requiring the use of high processing temperatures as required by conventional methods. In particular, in contrast to conventional methods of making foams, a support is coated with a solution of a hydrophilic polymer and a blowing agent. Interaction with the solution either prior to or after the step of coating gives rise to the generation of gas bubbles from the blowing agent which enables a material to be formed at low temperatures.

The material has uses in many applications including, amongst others, use as an inkjet medium.

DETAILED DESCRIPTION OF THE INVENTION

The present invention provides a method of making a material, the material having many different possible uses, including amongst others use as an inkjet medium. Initially, in the method of the present invention, a solution is formed of an aqueous polymer together with a blowing agent. The solution is coated onto a support such as resin-coated paper, film base, acetate, polyethylene terephthalate PET, printing plate or any other suitable support. Heat is applied to the solution, either before or after application to the support. The heat causes the blowing agent to decompose and create gas bubbles, thereby forming a polymer foam on the support. The foam is effectively a network of either open- or closed-cell arrangements of voids within a polymer matrix. When dry, the material is suitable for use as an inkjet medium. In particular, the material does not experience the problems associated with conventional porous or non-porous inkjet media.

There are two possible related approaches for forming the material, both of which rely on the formation of a porous hydrophilic polymer layer i.e. a hydrophilic polymer layer with void spaces produced by a generated gas. The gas can be generated either in a coating solution, or during a setting and drying process of the material. In other words, the gas can be generated either before or after the coating of the support.

If the gas is generated before the coating of the support the method involves the coating of a foamed polymer solution. Accordingly, the material is prepared by coating a support with a layer of foamed polymer solution in which micro-bubbles are formed. The micro-bubbles are formed in an aqueous solution of a hydrophilic polymer and foaming agent. The aqueous solution containing the micro-bubbles is then coated onto a support. The foamed polymer solution is created by heating the solution prior to its application to the support, to promote the decomposition of the blowing agent to generate a gas. Alternatively, an acid may be added to the solution to react with the blowing agent again to generate a gas within the solution. Preferably, a compound which on heating releases an acid is added to the solution. When the solution is heated, acid is released which reacts with the blowing agent to cause decomposition of the blowing agent and the consequent generation of gas.

If the gas is generated after the coating of the solution, the method involves the coating of a support with an aqueous solution of hydrophilic polymer with a blowing agent followed by the application of heat to the solution i.e. by heating the entire structure of the coated support. The coating is dried, and bubbles are caused to form in the coated layer by heating the layer or the entire coated material to a suitable temperature. In one example, the blowing agent is selected such that heat provided to dry the coated support is sufficient to cause decomposition of the blowing agent and generation of the gas. In an alternative example, a compound which on heating releases an acid is added to the solution. When the solution is then heated, acid is released which reacts with the blowing agent to cause decomposition of the blowing agent and the consequent generation of gas.

In both approaches described above, any suitable method of coating may be used to coat the solution onto the support. For example, curtain coating, bead coating, air knife coating or any other suitable method may be used. Typically, in bead coating a set-up is used in which a multi-layer arrangement of liquids is applied to a moving web via a hopper. The examples below describe such a set-up.

Both the approaches described above create a voided layer, which consists of a hydrophilic polymer e.g. (amongst others) polyvinyl alcohol (PVA), polyethylene oxide (PEO), polyvinylpyrrolidone (PVP), and gelatin. Any suitable hydrophilic polymer may be used in the method of the present invention. Where the material to be made is intended for use an inkjet medium, the polymer selected must be sufficiently swellable and hydrophilic for the formed material to function as an inkjet medium.

Preferably, surfactant may be added to the solution of hydrophilic polymer and blowing agent. The surfactant serves as a coating aid during coating of solution onto the support.

The blowing agent used in the method of the present invention is selected in dependence on the temperature at which it reacts to generate gas. By selecting a blowing agent that reacts at a relatively low temperature, material may be formed without requiring high temperatures. Examples of suitable blowing agents for use in the method of the present invention, include a mixture of sodium nitrite and ammonium chloride, metal carbonates and bicarbonates. Further examples of suitable blowing agents are described in, for example, the Handbook of Polymeric Foams and Foam Technology, Edited by Daniel Klempner and Kurt C. Frisch, Chapter 17: Blowing Agents for Polymer Foams, Section 3 Chemical Blowing Agents, (Chapter written by Dr. Fyodor A. Shutov).

In one example of the present invention, three layers of a solution of a polymer are coated simultaneously onto the support. It is possible that the proportion by weight of blowing agent to polymer in the different layers varies and in any one or more of the layers may be up to about 200%. Typically, it would be in an amount from about 10% to about 60%, preferably about 30% to about 50%.

A surfactant such as a Flouro-surfactant e.g. Olin 10G, Lodyne S100 or Zonyl FSN, may also be added to the hydrophilic polymer used in the porous hydrophilic polymer layer. The proportion by weight of surfactant, where present, to the weight of each layer of solution as applied to the support may also vary. Typically, it would be in an amount from about 0.01% to about 2.0%, preferably, about 0.01% to about 1.0%. In the case where any number of layer(s) of solution of polymer are coated, the proportions by weight of blowing agent to polymer and surfactant, where present, to solution may have values in the same ranges.

The invention is illustrated by the following examples. Examples 1 and 2 below relate to methods of making a material for use as an inkjet medium although it will be appreciated that the material as manufactured may find uses in any number of other possible applications.

EXAMPLES

A material was prepared as follows:

Example 1

A resin-coated paper support was coated with three layers. When the material is to be used as an inkjet medium, each of the layers functions as an ink-receiving layer and is therefore referred to as such in the example. Each layer comprised of polyethylene oxide (PEO), blowing agents (a total of 50% by weight compared to the PEO lay-down) and some surfactant.

The ink-receiving layer nearest the support consisted of 2.35 g/m² of PEO, 0.66 g/m² of sodium nitrite, 0.51 g/m² of ammonium chloride and 0.212 g/m² of Olin 10G surfactant. The middle ink-receiving layer consisted of 2.55 g/m² of PEO, 0.72 g/m² of sodium nitrite, 0.56 g/m² of ammonium chloride and 0.424 g/m² of Olin 10G surfactant. The top ink-receiving layer consisted of 2.77 g/m² of PEO, 0.78 g/m² of sodium nitrite, 0.61 g/m² of ammonium chloride and 0.636 g/m² of Olin 10G surfactant. The three layers were then coated simultaneously on a bead-coating machine using a standard slide hopper. A control coating was also prepared at the same time where the layers were identical to those described above, except the blowing agents (sodium nitrite and ammonium chloride) were omitted.

To initiate the blowing process, the dryers inside the coating track were set to 70° C. through which the coating of this invention was passed.

Example 2

A resin-coated paper support was coated with three layers. Again, when the material is to be used as an inkjet medium, each of the layers functions as an ink-receiving layer and is therefore referred to as such in the example. Each layer comprised of polyvinyl alcohol (PVA), blowing agents (a total of 50% by weight compared to the PVA laydown) and some surfactant.

The ink-receiving layer nearest the support consisted of 6.1 g/m² of PVA, 1.72 g/m² of sodium nitrite, 1.33 g/m² of ammonium chloride and 0.212 g/m² of Olin 10G surfactant. The middle ink-receiving layer consisted of 6.8 g/m² of PVA, 1.92 g/m² of sodium nitrite, 1.48 g/m² of ammonium chloride and 0.424 g/m² of Olin 10G surfactant. The top ink-receiving layer consisted of 7.5 g/m² of PVA, 2.11 g/m² of sodium nitrite, 1.64 g/m² of ammonium chloride and 0.636 g/m² of Olin 10G surfactant. The three layers were then coated simultaneously on a bead-coating machine using a standard slide hopper. A control coating was also prepared at the same time where the layers were identical to those described above, except the blowing agents (sodium nitrite and ammonium chloride) were omitted.

To initiate the blowing process, the dryers inside the coating track were set to 90° C. through which the coating of this invention was passed.

In both examples a material suitable for use as an inkjet medium was made without the use of high temperatures in the manufacturing process.

What is claimed is:

1. A method of making an inkjet medium comprising a support and a porous, swellable, foamed polymer ink receiving layer on top of the inkjet medium, wherein said support is selected from the group consisting of resin coated paper, film base, acetate and polyethylene terephthalate, said method comprising the steps of:

coating a support with a solution comprising a swellable hydrophilic polymer and a blowing agent or simultaneously coating a support with a plurality of solutions, each comprising a swellable hydrophilic polymer and a blowing agent; and after the step of coating said support, causing said blowing agent to generate gas bubbles within the solution or solutions, causing foaming of said hydrophilic polymer, thereby forming one or a plurality of ink-receiving layers, including at least the porous, swellable, foamed polymer ink receiving layer on top.

2. A method according to claim 1, in which the hydrophilic polymer is a polymer selected from the group consisting of polyvinyl alcohol, polyethylene oxide, polyvinylpyrrolidone and gelatin.

3. A method according to claim 1, in which a plurality of coating solutions, each comprising a hydrophilic polymer and a blowing agent, are coated simultaneously onto said support.

4. A method according to claim 1, in which a surfactant is included in the solution of hydrophilic polymer and blowing agent.

5. A method according to claim 4, in which the surfactant is a fluoro-surfactant.

6. A method according to claim 4, in which the proportion by weight of surfactant to the solution is in an amount from about 0.01% to about 2.0%.

7. A method according to claim 4, in which the proportion by weight of surfactant to the solution is in an amount from about 0.01% to about 1.0%.

8. A method according to claim 1, in which the proportion by weight of blowing agent to polymer is in an amount up to about 200%.

9. A method according to claim 8, in which the proportion by weight of blowing agent to polymer is in an amount from about 10% to about 60%.

10. A method according to claim 8, in which the proportion by weight of blowing agent to polymer is in an amount from about 30% to about 50%.

11. A method according to claim 1, in which the blowing agent is caused to generate gas bubbles within the solution thereby causing foaming of said hydrophilic polymer by applying heat to the solution.

12. A method according to claim 1, wherein the blowing agent is selected from the group consisting of metal carbonates, metal bicarbonates and a mixture of sodium nitrite and ammonium chloride.

* * * * *